United States Patent Office 2,722,081
Patented Nov. 1, 1955

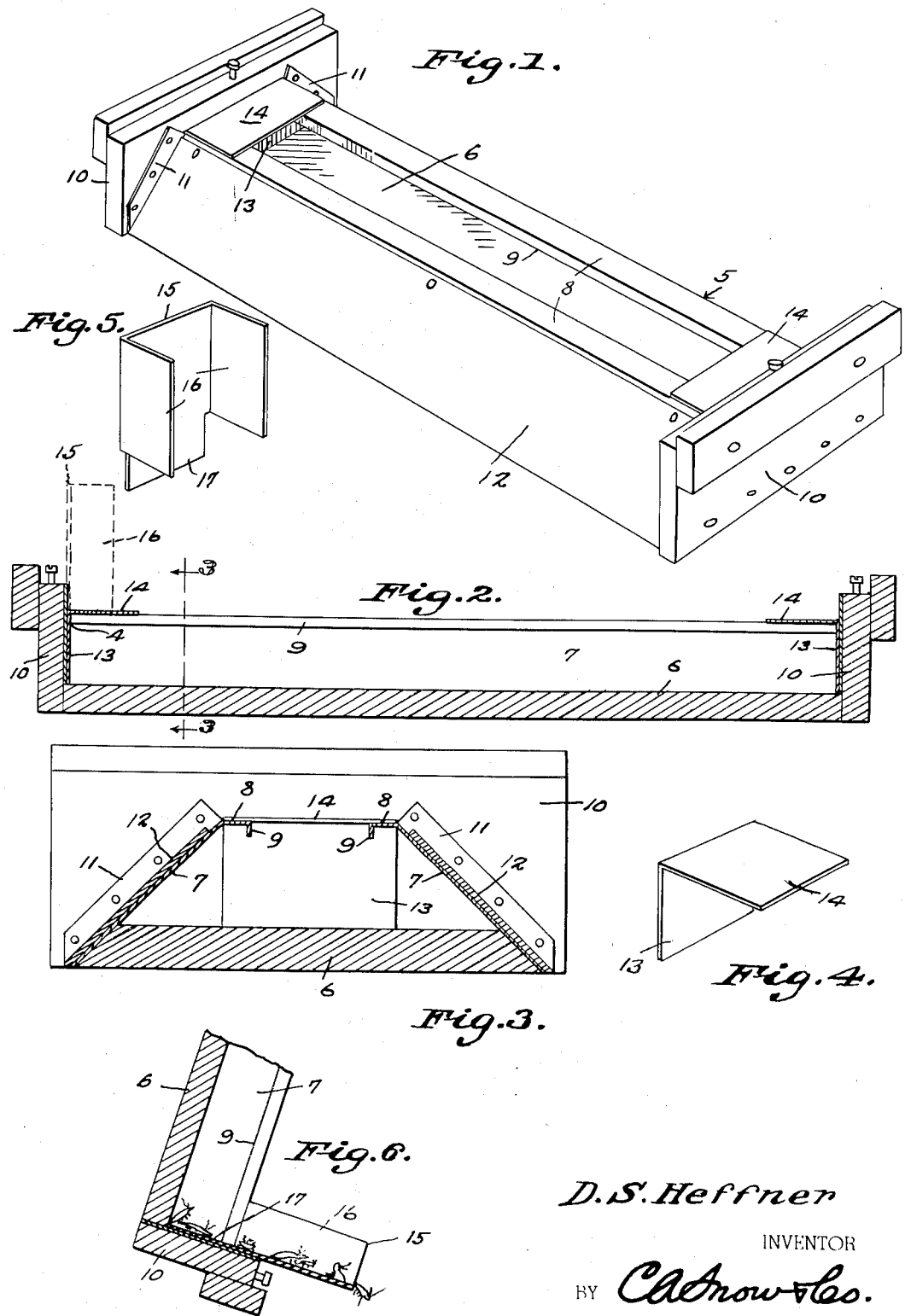

2,722,081

INSECT TRAP

Daniel S. Heffner, Lyons, Kans.

Application January 3, 1955, Serial No. 479,357

2 Claims. (Cl. 43—121)

This invention relates to insect traps, and more particularly to roach traps.

An important object of the invention is to provide an insect trap wherein the insects entering the trap will be prevented from escaping and held in the trap until they are finally destroyed. A further object of the invention is to provide an insect trap having a removable discharge trough adapted to be placed in one end of the trap, so that the insects may be readily flushed therefrom, when it is desired to clean the trap.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing,

Figure 1 is a perspective view of a roach trap, constructed in accordance with the invention.

Figure 2 is a longitudinal sectional view through the trap.

Figure 3 is a transverse sectional view of the trap taken on line 3—3 of Figure 2.

Figure 4 is a perspective view of one of the removable ends of the body of the trap.

Figure 5 is a perspective view of the removable trough positioned at one end of the body of the trap to facilitate cleaning.

Figure 6 is a fragmental sectional view illustrating the manner of flushing or cleaning the body of the trap.

Referring to the drawing in detail, the trap comprises an elongated body portion 5 that includes a bottom 6 and inclined side walls 7 disposed at a substantially 45° angle with respect to the bottom 6, the upper longitudinal marginal edges of the side walls being extended inwardly providing spaced flanges 8.

The flanges 8 have their longitudinal edges turned downwardly at 9 providing lips to prevent insects from crawling over the upper edges of the side walls to escape from the trap.

It might be stated that the side walls 7 are constructed preferably of sheet aluminum material presenting a smooth surface, and due to the angle of the side walls, it will be seen that it would be impossible for roaches or similar insects to crawl over the inner surfaces of the side walls to escape.

The ends of the body portion are substantially closed by the end members 10, to which the flanges 11 of the side walls 7 are secured, firmly fastening the side walls to the end members 10.

The outer surfaces of the side walls are covered with bricks of composition material, preferably of a color simulating natural wood, the coverings for the side walls being indicated by the reference character 12.

The ends of the inwardly extended flanges 8 are spaced from the end members 10, providing clearances or slots 4 at the ends of the trap for the reception of the wide flanges 13 of the end pieces 14 which close the trap at points adjacent to the ends thereof.

As clearly shown by Figure 5 of the drawing, a removable trough 15 is provided and is constructed of a length of sheet aluminum material, portions thereof being extended a right angles providing side pieces 16.

An extension 17 is provided as a part of the removable trough 15 and is disposed at right angles with respect to the side pieces 16, the extension providing a tongue to be positioned between the ends of the inwardly extended flanges 8 and the end members 10 of the trap, providing a trough as shown by Figure 6 of the drawing permitting a stream of water to be directed into the trap which has been turned on its end, flushing out the roaches or insects trapped in the trap.

It will of course be understood that suitable bait is provided in setting the trap, the bait being positioned within the trap, the bait prior to positioning in the trap having been rubbed over the outer surfaces of the trap, to attract the insects or roaches.

From the foregoing it will be seen that when the insects or roaches move over the outer surfaces of the side walls of the trap in an effort to obtain the bait, they will be lured into the trap and destroyed when cleaning the trap for resetting.

Having thus described the invention, what is claimed is:

1. An insect trap comprising a body having a bottom, side walls and end walls substantially closing the ends of said body, said side walls being inclined inwardly from the bottom, the upper ends of the side walls being spaced apart with their marginal free edges extended downwardly providing guard flanges, and removable end pieces disposed between the ends of said side walls and end walls and overlying portions of said side walls closing the space between the side walls at the ends of said side walls.

2. An insect trap comprising a body having a bottom, side walls and end walls substantially closing the ends of said body, said side walls being inclined inwardly from the bottom to the upper ends thereof and being spaced apart providing an entrance to the interior of said body, the upper longitudinal edges of said side walls being extended laterally towards each other and downwardly providing depending guard flanges, the ends of said guard flanges and laterally extending longitudinal edges of the side members being spaced from said end walls providing slots, and a removable trough adapted to be fitted in a pair of said slots.

References Cited in the file of this patent

UNITED STATES PATENTS

| | | |
|---|---|---|
| 115,215 | Keep | May 23, 1871 |
| 147,226 | Defranceschini | Feb. 3, 1874 |
| 181,165 | Hagen | Aug. 15, 1876 |
| 514,388 | Smih | Feb. 6, 1894 |